June 7, 1932. H. D. WINTON 1,861,517
METER REGISTER
Filed March 17, 1927
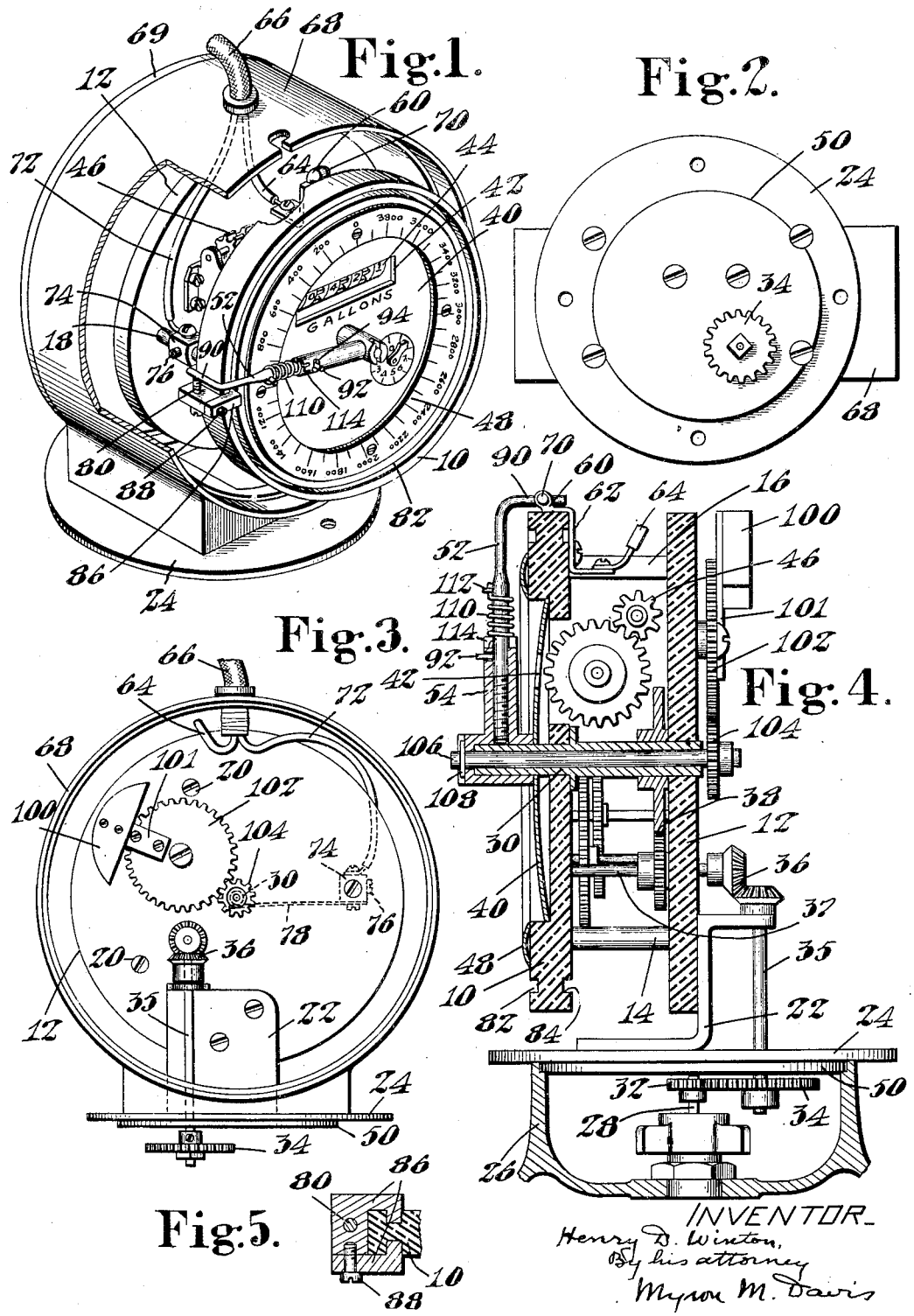
INVENTOR.
Henry D. Winton,
By his attorney
Myron M. Davis Patented June 7, 1932

1,861,517

UNITED STATES PATENT OFFICE

HENRY D. WINTON, OF WELLESLEY, MASSACHUSETTS, ASSIGNOR TO HERSEY MANUFACTURING COMPANY, OF SOUTH BOSTON, MASSACHUSETTS, A CORPORATION OF MASSACHUSETTS

METER REGISTER

Application filed March 17, 1927. Serial No. 176,235.

This invention relates to registering devices for meters and is illustratively shown as applied to a register of the type employed with water meters.

Meters are sometimes employed for the repeated measurement of a particular predetermined quantity which may be varied to suit the occasion or the use to which it is put. One such use is found in connection with water meters where these are employed for regulating water softeners. In that use, it is desired to know when a certain quantity of water has passed through the softener so that the machine may be refilled with softening material or the latter "regenerated" so that it will be suitable for further use. This problem may be successfully met by the employment of a meter in which the register is provided with an alarm device such as is shown in my copending application, Serial No. 31,913, filed May 21, 1925. Then the completion of the measurement, and hence the passage of the desired quantity of water, is accompanied by the closing of an alarm circuit so that the attendant may change the valves of the water softening machine. With that device, it is necessary, however, for the attendant to reset the indicator of the meter register in order that it may be ready for use again for a similar measurement. While this is perfectly satisfactory for many installations, other instances are found where it is desired to make the apparatus automatic so that attendance is not necessary at all or, at least, only at rare intervals. To this end, water softening machines have been provided which are arranged with motor operated valves and with automatic control panels designed to transfer the flow of water from one compartment of the softener to another and to regenerate the softening material just employed.

Accordingly, an object of the invention is to provide an improved meter register in which an indicator, useful for closing an electric circuit, is automatically reset.

The quantity of water which may be passed through the softener without necessitating attention or a change of condition is predetermined for any particular plant. It is desired, therefore, in that application of the device, that the register shall be so arranged that it will provide for the energization of other means to effect a desired change when the indicator of the register arrives at one limiting point in its range of movement, and so that it will be thereupon reset to another limiting position and reconnected to the driving mechanism ready to traverse the prescribed range again. To this end, one feature of the invention resides in automatic mechanism, in a register where an indicator is moved by a driven element which is responsive to the measuring operation, for connecting, releasing and reconnecting the indicator to the driven element, to the end that it may have a repeated movement over a predetermined range. In the illustrated device, a rotatable indicator arm is mounted upon a driven shaft for movement between a reset point and a contact or zero point. Means are provided for connecting the arm to the shaft at the reset point and for disconnecting it from the shaft at the contact point. A novel gravity-operated device is also provided for resetting the indicator arm which is arranged so that it is able to turn said arm around the shaft for more than 180 degrees in order that the full dial of the register may be utilized, if desired, and the range of movement of the arm made as much as 360 degrees.

In accordance with still other features of the invention, the illustrated device provides for the connection of the indicator arm to the driven shaft of the register by rotation of the arm about its own axis. In the form shown, the arm is threaded in a sleeve loose upon the shaft and is arranged to clamp the sleeve to the shaft when turned in one direction about its own axis and to release the sleeve so that the arm may be reset when turned in the other direction. The end of the arm is bent to engage stops disposed at the ends of the path of movement of the arm so that the fact of engagement between the bent end of the arm and the stops will be effective to screw up or to unscrew said arm.

Still other features of the invention will appear upon consideration of the following specification and claims, taken with the accompanying drawing, in which,—

Fig. 1 is a perspective view of the meter registered, with parts broken away and the cover removed;

Fig. 2 is a bottom view thereof;

Fig. 3 is a rear elevation with the back cover removed;

Fig. 4 is a side elevation with parts in section, on a larger scale; and

Fig. 5 is a detail section through the reset stop.

The illustrated register comprises a front disk 10 of insulating material and a similar disk 12 parallel to the first disk and held in spaced relation therefrom by crossrods 14, 16, 18 which are secured to said disks by screws 20. The framework provided by this structure is supported by means of a bracket 22 upon a base plate 24 which may be secured to the neck 26 of a meter. Within this neck is a driven stem 28, the rotations of which are proportional to the quantity of water, for example, which is measured. The register is provided with a driven hollow shaft 30, which is connected to the stem 28 by means of a train of gearing comprising pinions 32 and 34, a spindle 35, miter gears 36 one of which is mounted on a spindle 37, and a pair of spur gears 38, so that the number of turns of this shaft are also proportional to the number of gallons of water measured.

The front disk 10 is recessed for the reception of a dial 40 which has a window slot 42 to allow the inspection of totalizing counters 44 which may be driven in any usual and convenient fashion by pinions 46 driven in turn by gears which are partly shown in Fig. 4, to indicate the total number of gallons of water passed through the meter. An auxiliary annular dial 48 is also mounted upon the front disk 10 and is graduated in accordance with the use to which the particular register is to be put. If it is desired to use the register on a meter handling greater or less quantities of water, the ratio of the pinions 32 and 34 may be changed and the legends on the auxiliary dial 48 varied accordingly. To facilitate this sort of a change, the base plate 24 of the register is provided with an eccentrically positioned projection 50 adapted to be received in a corresponding recess inside the neck 26 of the meter. By variably determining the position of the projection 50 upon the base plate 24, the pinion 34 may be brought into exact mesh with the pinion 32 of the meter as the register is mounted on the meter, even though the sum of the radii of said pinions is not constant when the ratio between them is changed.

Extending radially from the shaft 30 to overlie the annular dial 48 is an indicator comprising an arm 52 the inner end of which is threaded in a sleeve 54 loose upon the shaft 30 and having a radial extension extending laterally from the shaft. The extreme inner end of the arm 52, when the arm is turned around its own axis to screw it into the sleeve 54, engages the shaft 30 to clamp the arm directly to the shaft and acts as a releasable mechanical connector for connecting the indicator to the shaft. Conversely, when the arm 52 is unscrewed the indicator will be released from the shaft so that it may be reset.

Preferably and as illustrated, the indicator arm 52 serves also to complete an electric circuit when it reaches the zero position at the top of the dial 48. To this end, a fixed contact stop 60 is provided upon a bracket 62 which is screwed to the insulating disk 10 and is provided with a screw for connecting one wire 64 of a pair 66 led through the casing 68 of the register. This casing 68 is provided with a removable back cover 69 and with a removable front cover (not shown). An insulating button 70 is mounted upon the back side of the contact stop 60 so that the arm 52 can only make effective electrical contact therewith on the front side. The other wire 72 of the pair 66 is clamped to a block 74 held upon the cross-rod 18 by a set screw 76 and provided with a metal brush 78 bearing against the shaft 30. Thus the arm 52 forms the terminal of one side of the electric circuit and the contact stop 60 the terminal of the other side, said circuit being arranged when closed to energize other means (not shown) such as the motors or the control relays of an automatic softening machine to cause another event or effect a desired change after the predetermined quantity of water has passed through the meter.

In order that this measured quantity may be varied, a stop 80 is arranged to be adjustably positioned around the periphery of the disk 10. The disk 10 is provided with annular grooves 82 and 84 to receive the inturned ends of a clamp 86 supporting the stop 80. A screw 88 binding together the component parts of the clamp 86 serves to grip it in adjusted position upon the disk 10. The portion of the dial 48 between the stops 80 and 60 constitutes the range of movement of the arm 52 and the stop 80 is set according to the quantity of water which is to be measured and passed through the water softener. Supposing that the arm 52 has been connected to the shaft 30 at the stop 80, by screwing the arm 52 into the sleeve 54, the indicator will travel to the top of the dial and make contact with the stop 60 and complete an electric circuit. It is desired then to reset the indicator arm and to cause it to repeat the operation.

For this purpose, the outer end of the arm 52 is bent inwardly at 90 to overlie the periphery of the disk 10 and bring it into the range of the stops 60 and 80. The result of the engagement of this inwardly bent end 90 with the stop 60 is first to complete the electric circuit through the stop and arm and mechanically to turn the arm 52 around its own axis in a direction to unscrew it from the sleeve 54 and hence to disconnect it from the shaft 30. It will then fall against the stop 80 which will turn the end 90 in a direction to screw the arm 52 into the sleeve 54 and reconnect the indicator arm to the driven shaft 30 of the register. The range of turning movement of the arm 52 in the sleeve 54 is limited by a pin 92 passing through a slot 94 in said sleeve so that the arm 52 can not be unduly loosened nor require more than a slight turning movement to reconnect it to the shaft.

So that the operations of resetting and reconnecting the arm 52 with respect to the shaft 30 may be made more positive, power operated mechanism is provided for turning the arm 52 around the shaft 30 after it has been released therefrom. This comprises a weight 100 carried by a radial arm 101 upon a gear 102 pivoted on the back of the rear disk 12. This gear 102 meshes with a gear 104 upon a spindle 106 passing through the hollow shaft 30 and connected to the sleeve 54 by a cross pin 108. The ratio of the gears 102 and 104 is such that movement of the weight 100 through only a small quadrant will be sufficient to carry the arm 52 completely around the dial as distinguished from the 180° of the dial which would be useful if the weight of the arm 52 itself were depended upon to reset it and bring it against the stop 80. It should also be noted that the resetting weight furnishes a substantially constant and amply sufficient force for causing the engagement of the end 90 of the arm 52 with the stop 80 to screw in the arm 52 and reconnect it to the shaft 30.

In order to make even more positive the operation of the device, a light spring 110 is wrapped around the arm 52 and, with one end of the spring engaging a laterally projecting pin 112 in the arm 52 and the other end of the spring engaging one of a series of slots 114 in the outer end of the sleeve 54, this spring tends to turn the arm axially in a direction to disconnect it from the shaft 30. The tension of the spring may be adjusted by choosing the slot 104 in which to position one end of it and its tension is so adjusted that it is never enough to release the arm of itself, but, once the arm has been turned by the engagement of the end 90 with the stop 60, then the spring will snap it around into fully released position ready for the resetting movements. Obviously, too, the tension of the spring 110 is not sufficient to interfere with the reconnection of the arm with the shaft when the end 90 hits the stop 80.

Having selected a meter of proper capacity and a register having the desired range and dials, it is only necessary, in order to put the device in operation, to connect the leads 66 to the proper circuit of the softener control panel and to set the stop 80 at the desired position with respect to the dial 48. The device will then operate to measure the corresponding quantity of water, one thousand gallons for example, and will close the circuit through said leads 66 when the arm 52 contacts with the stop 60. The register is so arranged that the arm will remain in contact with the stop 60 for a few seconds while the end 90 is being turned sufficiently to release the arm 52. The spring 110 will then snap it suddenly around and prevent any tendency for the arm to drag on the shaft 30 as it is reset. The arm 52, under the impulse of the weight 100, will then be thrown back against the stop 80 and reconnected to the shaft 30 in the manner already explained, ready for an immediate repetition of the measuring and contact making operation.

Having thus described my invention, what I claim as new and desire to secure by Letters Patent of the United States is:

1. In a meter register, a driven element responsive to the measuring operation, an indicator adapted to be moved by said driven element, said indicator including relatively movable clamping devices for automatically clamping said indicator to said driven element for movement therewith, and cooperating means for automatically releasing the indicator from and again securing it to the driven element constructed and arranged to effect the repeated movement of the indicator with the driven element over a predetermined range.

2. In a meter register, a continuously rotating driven element responsive to the measuring operation, an indicator adapted to be moved by said driven element, said indicator having movable means for automatically connecting the indicator directly to said driven element for movement therewith, and means coöperating with said movable means for releasing the indicator from and reconnecting it to the driven element constructed and arranged to effect the repeated movement of the indicator with the driven element over a predetermined range.

3. In a meter register, a driven shaft, and an indicator on said shaft and rotatable about said shaft, said indicator comprising an arm constructed and arranged for turning movement about its own axis thereby to connect the indicator to the shaft to turn therewith or to release it from the shaft so that it may be moved independently to a reset position.

4. In a meter register, a shaft driven in one direction by the operation of the meter, a fixed contact, and a movable indicator having a displaceable gripping arm adapted to be displaced to grip the indicator to said shaft so as to be driven thereby and moved from a predetermined starting position to carry said arm into engagement with said contact thereby to complete an electric circuit, the engagement of said arm and contact acting also to release said indicator by the displacement of the arm by the fixed contact thereby automatically to release the indicator from the shaft and to return said indicator to its starting position after said circuit has been completed.

5. In a meter register, a driven shaft, an indicator on said shaft and rotatable about said shaft, said indicator comprising an arm mounted therein for turning movement about its own axis in one direction to connect the indicator to the shaft to turn therewith or in the other direction to release it from the shaft so that it may be moved independently to a reset position, stops adjacent to the path of movement of said arm, and means upon said arm for engagement with said stops thereby respectively to turn the arm axially in opposite directions.

6. In a meter register, a hollow driven shaft adapted to be turned in one direction, an indicator arm rotatable upon said shaft and adapted releasably to be secured directly to the shaft for rotation therewith, a stop for said arm, a spindle within said shaft connected to said arm, and a power operated device connected to said spindle for turning said arm to a limiting position as determined by said stop when the arm is released from the shaft.

7. In a meter register, a driven shaft adapted to be turned in one direction, an indicator arm rotatable upon said shaft and adapted releasably to be secured directly to the shaft for rotation therewith, a pair of stops for said arm, movable means on said arm operable by said stops to connect the arm to the shaft and to release it therefrom, and a gravity operated device connected to said arm by reducing gears to turn it to a limiting position as determined by one of said stops when it is released from the shaft, said gravity operated device being arranged to turn said arm around the shaft through more than 180° by movement through less than 180°.

8. In a meter register, a dial, a hollow shaft projecting through said dial adapted to be turned in one direction, an arm projecting laterally from said shaft across the face of the dial, means releasably to connect said arm to the shaft for rotation therewith, a spindle within said hollow shaft connected to said arm, and means urging said spindle to rotate in a direction opposite to that of the shaft so as to reset the arm when it is released from the shaft.

9. In a meter register, a shaft, a sleeve rotatable upon said shaft and having a radial extension, and an indicating arm threaded in said extension arranged so that it may be brought into engagement with said shaft thereby to clamp the sleeve and the arm to the shaft for rotation therewith.

10. In a meter register, a driven shaft, an indicator on said shaft and rotatable about said shaft in a plane normal to the shaft, stops at one side of said plane, said indicator comprising an arm projecting radially from the shaft and constructed and arranged for turning movement about its own axis and having an offset portion adapted to engage said stops to turn the arm about its own axis thereby to connect the indicator to the shaft to turn therewith or to release it from the shaft so that it may be moved independently to a reset position, and means to limit the axial rotation of the arm thereby to hold the offset portion in position for engagement with said stops.

11. In a meter register, a constantly rotated shaft, a sleeve freely rotatable upon said shaft, an indicating arm threaded in said sleeve and arranged so that it may be turned into engagement with said shaft thereby to clamp the sleeve and the arm to the shaft for rotation therewith, a weak spring surrounding said arm and tensioned between the arm and the sleeve, respectively, and tending ineffectively to release said screw clamp, and means for turning said arm to release it, said means being made effective by rotation of the shaft.

12. In a meter register, a dial, a driven shaft at the center of the dial, an indicator having an arm projecting radially from the shaft across the face of the dial, said arm being constructed and arranged for turning movement about its own axis thereby to connect or disconnect the indicator from the shaft, and stops arranged around the periphery of the dial, said arm having a bent terminal portion extending to a position for engagement with said stops thereby to rotate the arm around its own axis and connect it to, or disconnect it from, the shaft.

In testimony whereof I have signed my name to this specification.

HENRY D. WINTON.